(12) United States Patent
Andre et al.

(10) Patent No.: US 9,552,263 B2
(45) Date of Patent: Jan. 24, 2017

(54) SYSTEM, APPARATUS, AND METHOD TO DYNAMICALLY CHANGE SYSTEM RECOVERIES BASED ON SYSTEM LOAD

(71) Applicant: International Business Machines Corporation, Armonk, NY (US)

(72) Inventors: Herve G. P. Andre, Orlando, FL (US); Mark E. Hack, Austin, TX (US); Larry Juarez, Tucson, AZ (US); Todd C. Sorenson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 122 days.

(21) Appl. No.: 14/458,059

(22) Filed: Aug. 12, 2014

(65) Prior Publication Data
US 2016/0048433 A1    Feb. 18, 2016

(51) Int. Cl.
*G06F 11/00* (2006.01)
*G06F 11/20* (2006.01)

(52) U.S. Cl.
CPC ....... *G06F 11/2033* (2013.01); *G06F 2201/86* (2013.01)

(58) Field of Classification Search
USPC ........................................... 714/47.1
See application file for complete search history.

(56) References Cited

U.S. PATENT DOCUMENTS

| | | | |
|---|---|---|---|
| 7,246,254 B2 | 7/2007 | Alur et al. | |
| 8,392,752 B2 | 3/2013 | Ikeuchi et al. | |
| 8,397,293 B2 | 3/2013 | Aupperle et al. | |
| 2006/0190761 A1* | 8/2006 | Hu | G06F 17/301 714/6.11 |
| 2007/0168748 A1* | 7/2007 | Musoll | G06F 9/546 714/38.14 |
| 2007/0220371 A1* | 9/2007 | Duyanovich | G06F 11/3447 714/49 |
| 2009/0144678 A1* | 6/2009 | Bose | G06F 11/2023 716/106 |
| 2012/0151276 A1* | 6/2012 | Bjorner | G06F 11/3055 714/47.1 |
| 2013/0067266 A1* | 3/2013 | Gearing | G06F 11/008 714/4.1 |
| 2014/0281700 A1* | 9/2014 | Nagesharao | G06F 11/1415 714/15 |

* cited by examiner

*Primary Examiner* — Sarai Butler
(74) *Attorney, Agent, or Firm* — Kunzler Law Group

(57) ABSTRACT

A method for dynamically changing system recovery actions based on system load. The method includes measuring a value of a workload characteristic of a computer system over a period of time, detecting an error in the computer system, determining a workload level of the computer system, and selecting a set of error recovery actions in response to the system workload analysis module determining the workload level of the computer system. A workload characteristic defines a type of work performed by the computer system. A workload level can be based on user defined parameters or a measurement of the value of one or more workload characteristics.

17 Claims, 7 Drawing Sheets

SYSTEM, APPARATUS, AND METHOD TO DYNAMICALLY CHANGE SYSTEM RECOVERIES BASED ON SYSTEM LOAD

FIELD

The subject matter disclosed herein relates to computer system recovery and more particularly relates to dynamically changing system recovery based on system load.

BACKGROUND

When an error occurs in a computer system, one or more actions are taken by the system to mitigate and/or recover from the error. These actions may include, but are not limited to, logging the error and/or system state, shutting down one or more system components, rebooting one or more system components, or running diagnostics on the system. Depending on the workload of the system when the error occurs, mitigation or recovery actions may affect the performance, and with it the service level, of the system.

BRIEF SUMMARY

An apparatus for dynamically changing system recovery actions based on system load is disclosed and includes a monitoring module, an error detection module, a system workload analysis module, and a system recovery module. The monitoring module measures a value of a workload characteristic of a computer system over a period of time. The error detection module detects an error in the computer system. The system workload analysis module determines a workload level of the computer system. In one embodiment, the system workload analysis module also determines the workload level of the computer system, and includes comparing the measured value of the workload characteristic of the computer system when the error detection module detected the error and the highest measured value of the workload characteristic of the computer system during an earlier period of time. In another embodiment, the system workload analysis module also determines a direction of the workload level of the computer system. The system recovery module selects a set of error recovery actions in response to the determined workload level of the computer system.

In one embodiment, the apparatus also includes a recovery impact analysis module that determines, for each error recovery action of the set of error recovery actions, an impact of the error recovery action on one or more performance characteristics of the computer system. In the same embodiment, the system recovery module selects and initiates an error recovery action from the set of error recovery actions in response to the determined impact of each error recovery action on the one or more performance characteristics of the computer system. In certain embodiments, the system recovery module selects and initiates the error recovery action having the lowest impact on the one or more performance characteristics of the computer system.

In one embodiment, the error detection module also tracks an error occurrence rate of the error; the system recovery module establishes error occurrence rate thresholds for initiating recovery actions. In this embodiment, the system recovery module adjusts the error occurrence rate threshold for the same error in response to the system workload analysis module determining the workload level of the computer system and comparing the error occurrence rate of the error to the error occurrence rate threshold for the same error.

A method for dynamically changing system recovery actions based on system load is disclosed, the method measuring a value of a workload characteristic of a computer system over a period of time, detecting an error in the computer system, determining a workload level of the computer system, and selecting a set of error recovery actions in response to the system workload analysis module determining the workload level of the computer system. In one embodiment, determining the workload level of the computer system includes comparing the measured value of the workload characteristic of the computer system when detecting the error to the highest measured value of the workload characteristic of the computer system during an earlier period of time. In another embodiment, the method also determines a direction of change in the workload level of the computer system.

In one embodiment, the method also determines, for each error recovery action of the set of error recovery actions, an impact of the error recovery action on one or more performance characteristics of the computer system. In the same embodiment, the method initiates an error recovery action from the set of error recovery actions in response to determining the impact of each error recovery action on the one or more performance characteristics of the computer system. In certain embodiments, the method initiates the error recovery action having the lowest impact on the one or more performance characteristics of the computer system.

In one embodiment, the method also tracks an error occurrence rate of the error. In this embodiment, the method adjusts an error occurrence rate threshold for the same error in response to determining the workload level of the computer system and comparing the error occurrence rate of the error to the error occurrence rate threshold for the same error.

A computer program product for dynamically changing system recovery actions based on system load is disclosed; the computer program product incorporates program instructions to measure a value of a workload characteristic of a computer system over a period of time, detect an error in the computer system, determine a workload level of the computer system, and select a set of error recovery actions in response to the system workload analysis module determining the workload level of the computer system. In one embodiment, determining the workload level of the computer system includes comparing the measured value of the workload characteristic of the computer system when detecting the error to the highest measured value of the workload characteristic of the computer system during an earlier period of time. In another embodiment, the computer program product also includes program instructions to determine a direction of change in the workload level of the computer system.

In one embodiment, the computer program product also includes program instructions to determine, for each error recovery action of the set of error recovery actions, an impact of the error recovery action on one or more performance characteristics of the computer system. In the same embodiment, the computer program product further includes program instructions to initiate an error recovery action from the set of error recovery actions in response to determining the impact of each error recovery action on the one or more performance characteristics of the computer system. In certain embodiments, the computer program product has program instructions to initiate the error recovery action having the lowest impact on the one or more performance characteristics of the computer system.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
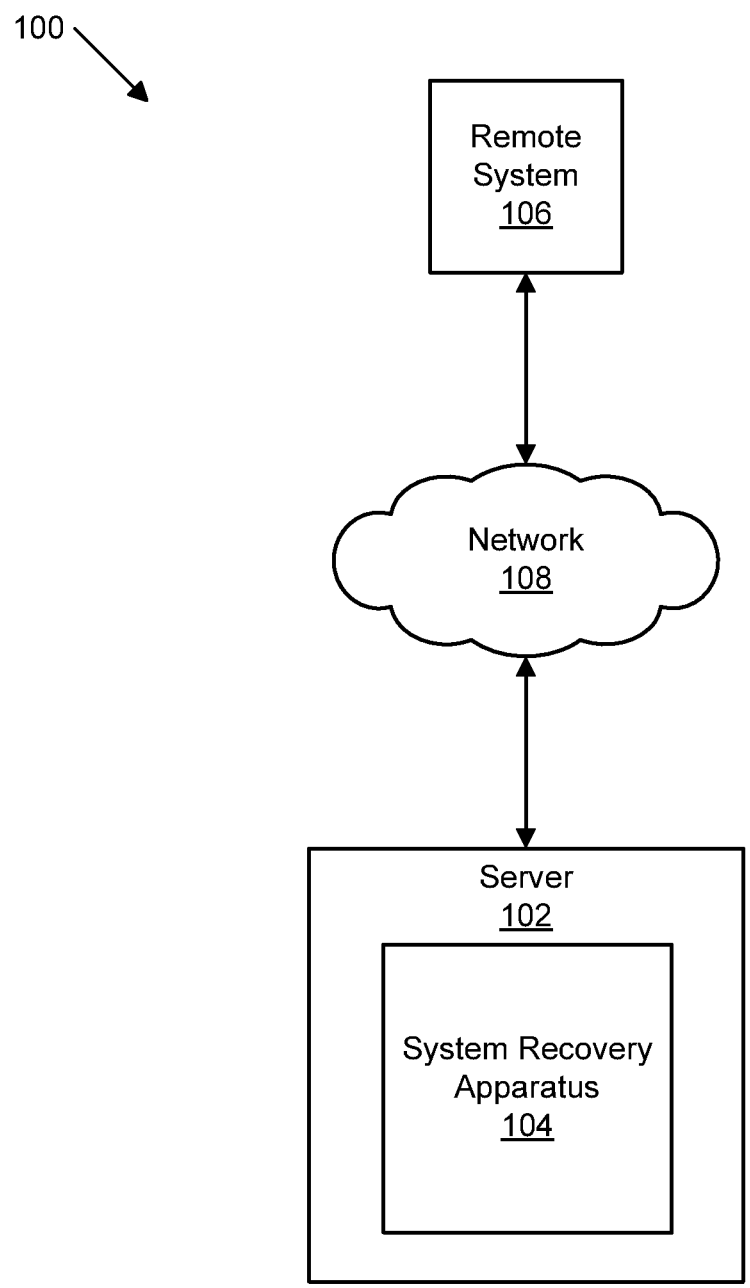
FIG. 1 is a schematic block diagram illustrating one embodiment of a system for dynamically changing system recovery actions based on system load.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act on or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a system 100 for dynamically changing system recovery actions based on system load. The system 100 includes a server 102, an error recovery apparatus 104, a remote system 106, and a network 108, which are described below.

Figure 2:
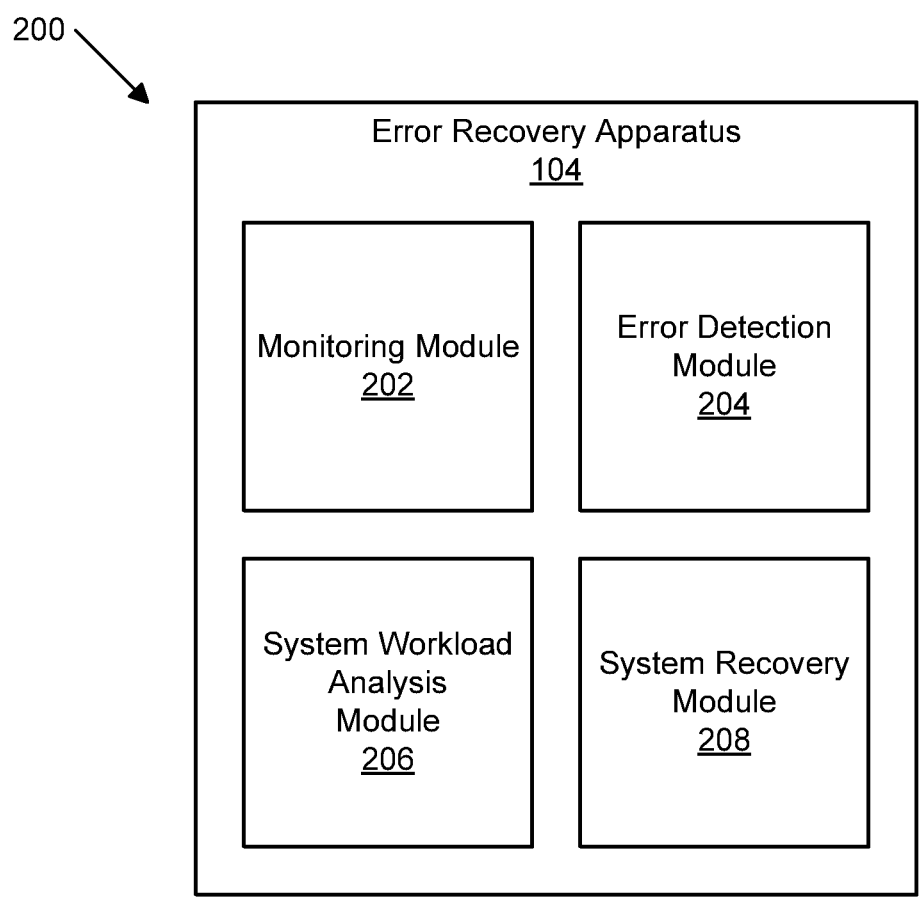
FIG. 2 is a schematic block diagram illustrating one embodiment of a an apparatus for dynamically changing system recovery actions based on system load.
Figure 3:
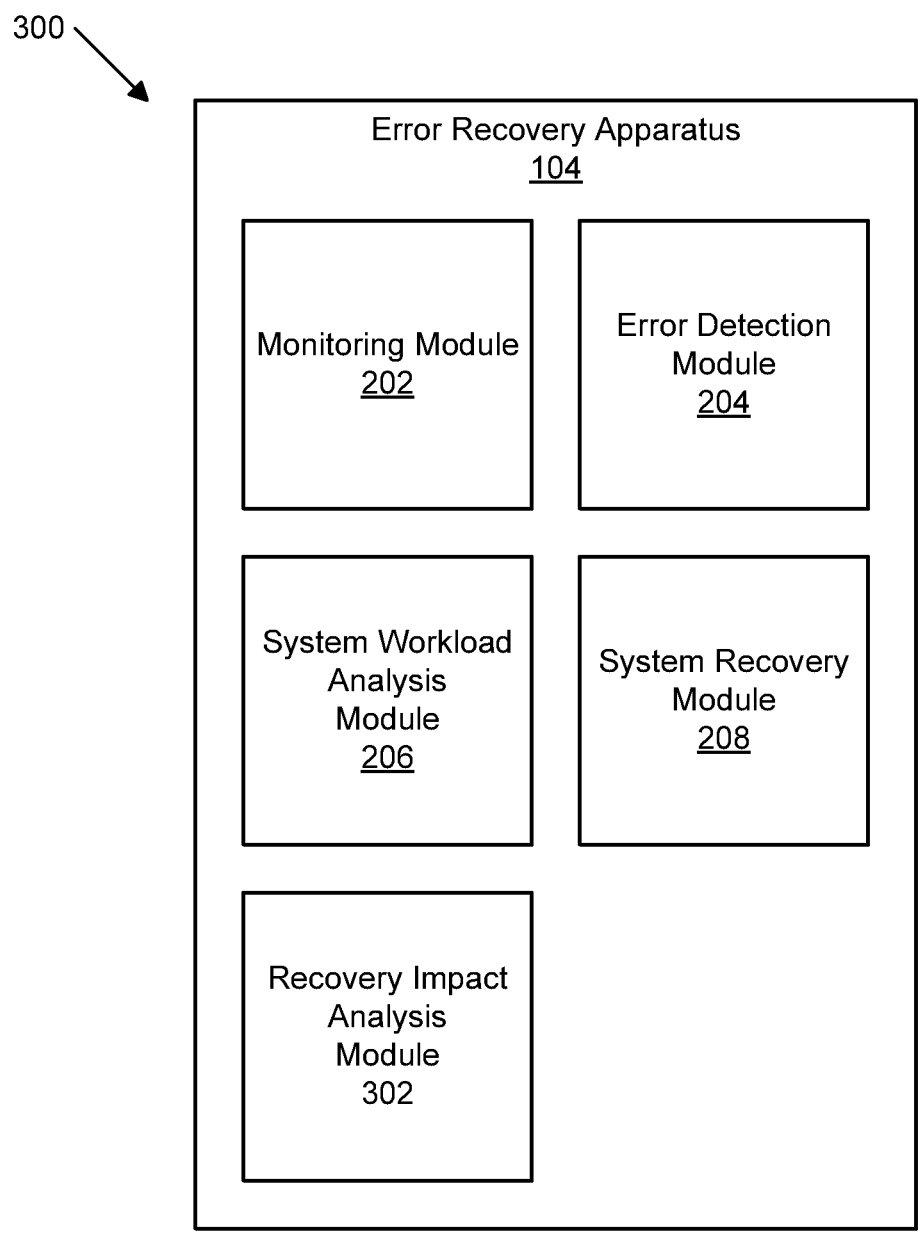
FIG. 3 is a schematic block diagram illustrating another embodiment of a an apparatus for dynamically changing system recovery actions based on system load.

The system 100, in one embodiment, includes a server 102 with an error recovery apparatus 104, which is described in further detail with respect to FIGS. 2 and 3. In one embodiment, the server 102 may be any computer accessible by a remote system 106 over a network 108. In another embodiment, the server 102 may be any computer directly connected to a remote system 106 via cable, fiber or other connection equipment known to those in the art. The server 102 can be a database server, a mainframe server, a workstation, a desktop computer, or the like. The remote system 106 may be any computer or other electronic device that is capable of accessing the server 102. For example, the remote system 106 may be a laptop or desktop computer, a tablet, a smartphone, a television, another server, etc. The network 108 may include a local area network ("LAN"), a wide area network ("WAN"), wireless network, cellular network, the Internet, a fiber optic network, or the like. In one embodiment, the network 108 includes multiple networks. For example, the network 108 may include a cellular network along with another network capable Internet connection. In another example, the network 108 includes a wireless network along with a wired network. The network 108 may include switches, routers, servers, cabling and other equipment known to those in the art.

FIG. 2 is a schematic block diagram illustrating one embodiment of an apparatus 200 for dynamically changing system recovery actions based on system load. The apparatus 200 includes one embodiment of an error recovery apparatus 104 with a monitoring module 202, an error detection module 204, a system workload analysis module 206, and a system recovery module 208, which are described below.

The monitoring module 202 measures a value of one or more workload characteristics of a computer system over a period of time. The computer system can be the server 102 or the remote system 106. A workload characteristic refers to any type of work that a computer system is performing. The workload characteristic may include a computer system's data input/output ("IO") rate, its processor load, response time, database access time, disk access time, temperature, or the like. In one embodiment, the monitoring module 202 measures a value of one or more workload characteristics of a computer system continuously while the computer system is powered on. In another embodiment, the monitoring module 202 measures a value of one or more workload characteristics of a computer system periodically. For example, the monitoring module 202 may measure the processor load of a computer system every 250 milliseconds.

The error detection module 204 detects errors in the computer system. In one embodiment, the error detection module 204 detects errors in the computer system by polling components in the computer system. In another embodiment, the error detection module 204 detects errors in the computer system through notifications from components in the computer system. System errors come in different types and the error detection module 204 can track a rate of occurrence for each error type. The error occurrence rate is the frequency of the error over a certain period of time. A computer system, its subsystems, or its components, may have an error occurrence rate threshold. As described further below, this threshold may be used to determine whether error recovery is necessary and/or which error recovery actions are taken. The threshold may be adjusted in response to the workload level of a computer system. For example, the threshold may be adjusted upward if the workload level of a computer system is high and adjusted downward if the workload level is low.

The system workload analysis module 206 determines a workload level of the computer system. In one embodiment, the workload level of the computer system is based on a measurement of the value of one or more workload characteristics. For example, the workload level of the computer system can be measured by comparing the measured value of a workload characteristic of the computer system when the error detection module detected the error with the highest measured value of the same workload characteristic of the computer system during an earlier period of time. The length of this earlier period of time may be set randomly. Alternatively, the length of this earlier period of time may be set based upon the frequency of the error or the type of error detected. Using data IO rate as an example, the system workload analysis module 206 can measure and express the workload level of a computer system when an error is detected as a ratio of the data IO rate at the time of error detection (e.g. 500 MB/s at 9:30 p.m. on Tuesday) to the maximum data IO rate observed for the computer system over (i) a five minute period prior to error detection (e.g., 1.5 GB/s); (ii) the same five minute period from the previous day; or (iii) the same five minute period from the previous week. In another embodiment, the workload level of a computer system is based on user defined parameters. An example of a user defined parameter is user defined quality-of-service windows. For example, a computer system may have high utilization activity from 10 p.m. to midnight each day or the last three days of every month, and thus the workload level of the computer system would be set to "high" for these windows.

The system workload analysis module 206 can go a step further by measuring the calculated ratio against a workload standard for the particular workload characteristic to determine the workload level of the computer system. The workload standard for a workload characteristic may be user defined (e.g., low=0 to 0.25; medium=0.26 to 0.60; high=0.61 to 1.0). Using the earlier data IO rate example having a ratio of 0.333 (500 MB/1.5 GB), the system workload analysis module 206 can compare the resulting ratio to a data IO rate workload scale for the computer system to determine the workload level for the computer system. In this expanded example, the workload level of the computer system may be expressed numerically (e.g., on a 1-5 scale) or otherwise (e.g., low, medium, high). Alternatively, the workload standard for a workload characteristic can be defined by physical limits of the system or system sub-components. For example, a hardware adapter or hard disk in a computer system has a maximum data IO rate and/or response time that serves as an upper bound on the workload level of the computer system, and static percentages of the upper bound can be used to define "low," "medium," or "high" workload levels for the computer system.

The system workload analysis module 206 can also determine a direction of the workload level of the computer system. A direction of the workload level of a computer system may be increasing, decreasing, or flat. The system workload analysis module 206 determines the direction of the workload level of a computer system by calculating the rate of change in the measured value of a workload characteristic of the computer system at a particular point in time. For example, the system workload analysis module 206 can calculate the rate of change in the measured value of a workload characteristic when an error is detected by examining the values of the workload characteristic over a time period that includes the time when the error was detected, plotting the values of the workload characteristic as a function of time (e.g., y=f(x), where y is the value of the workload characteristic and x is time), and calculating the derivative of the function at the time when the error was detected. A positive rate of change indicates that the workload level of a computer system is increasing. A negative rate of change indicates that the workload level of a computer system is decreasing. A zero or near-zero rate of change indicates that the workload level of a computer system is remaining constant. As described further below, the direction of the workload level for a computer system may be used to determine what error recovery actions are taken, if any.

The system recovery module 208 selects a set of error recovery actions in response to the system workload analysis module 206 determining the workload level of the computer system. The set of error recovery actions may contain one or more error recovery actions. An error recovery action may include many different actions, including but not limited to (i) increasing the error occurrence rate threshold; (ii) deferring error recovery; (iii) collecting data regarding the error; (iv) shutting down a system component; (v) and/or restarting a system component.

Increasing an error occurrence rate threshold means delaying or deferring any attempt to recover from the error. In some computer systems, not every error requires recovery, and thus the computer system will only attempt error recovery if the error occurrence rate exceeds the error occurrence rate threshold. In one embodiment, when the workload level of a computer system is low and the error occurrence rate exceeds the error occurrence rate threshold, the system recovery module 208 will decide to attempt error recovery. Thus, for example, if a disk adapter's error rate exceeds its error rate threshold, the system recovery module 208 may select to shut down the adapter and/or reboot it. In the same embodiment, when the workload level of the computer system is high and the error occurrence rate exceeds the error occurrence rate threshold, the system recovery module 208 will select to increase the error occurrence rate threshold to defer error recovery. Thus, using the previous example, the system recovery module 208 will select to increase the disk adapter error rate threshold and not shut down or reboot the disk adapter. Instead, the system recovery module 208 may select to either ignore the disk adapter error or just log data relating to the error. In the same embodiment, when the workload level of the computer system is in the medium range and the error occurrence rate exceeds the error occurrence threshold, the system recovery module 208 will decide whether to increase the error occurrence rate threshold based on the direction of the workload level of the computer system when the error was detected. Continuing with the previous example, if the direction of the workload level of a computer system is increasing or flat, the system recovery module 208 will decide to increase the disk adapter error rate threshold. But if the direction of the workload level is decreasing, then the system recovery module 208 may decide to shut down the adapter and/or reboot it.

How much the error occurrence rate threshold is increased or decreased is based on a historical measurement of the error occurrence rate. In one embodiment, when the workload level of a computer system is high, the system recovery module 208 decides to increase the error occurrence rate such that it is a higher percentage of, near, or equal to the maximum recorded error occurrence rate for an earlier time period. Similarly, when the workload level of a computer system is low, the system recovery module 208 decides to decrease the error occurrence rate to be a lower percentage of, near, or equal to the minimum recorded error occurrence rate for an earlier time period.

Increasing the error occurrence rate threshold is just one form of deferring error recovery. Another form of deferring error recovery is to schedule the error recovery action for a later time. There are a variety of ways to determine how long to defer the error recovery action. In one embodiment, when the workload level of a computer system is considered high due to a user defined service window, the system recovery module 208 will decide to schedule the error recovery action for a time outside the service window. In another embodiment, when the system workload analysis module 206 determines that the workload level of a computer system is high, the system recovery module 208 may decide to record the error and set a timer for the system workload analysis module 206 to re-determine the workload level of the computer system to see if error recovery should proceed. The length of the timer may be based on present error occurrence rate. For example, the length of the timer may be set so that the timer will expire before another error of the same type is expected to occur.

Collecting data regarding an error may be an error recovery action by itself or coupled with another error recovery action. As mentioned herein, in some computer systems, not every error requires error recovery, and thus collecting data regarding an error for later analysis will be sufficient. If data collection about an error is coupled with another error recovery action, then the data collection may be considered another form of deferring error recovery. For example, if a computer system has a high workload level when an error occurs, the system recovery module 208 may elect to only collect data regarding the error (e.g., type, frequency, location, system state) for later analysis.

The amount of data collected regarding the error may differ depending on the workload level of the computer system. For example, the system recovery module 208 may decide to collect more data regarding an error when a computer system's workload level is low and less data when the workload level is high. Similarly, when a computer system's workload level is medium, the system recovery module 208 may decide to collect more data if the direction of the workload level is decreasing and less data if the direction of the workload level is increasing.

Shutting down or restarting a system component are more robust error recovery actions than the aforementioned recovery actions. Shutting down or restarting a system component can reduce or even stop future errors. But these error recovery actions may have a much larger impact on the performance of the computer system than deferring error recovery because a system component will be unavailable for a period of time when it is shut down or rebooted. In one embodiment, the system recovery module 208 selects shutting down or restarting a system component when the workload level of the computer system is (i) low or (ii) medium and the direction of the workload level is decreasing. In another embodiment, the system recovery module 208 select the option of shutting down or restarting a system component when doing so will not adversely impact overall system performance. In one embodiment, the system recovery module 208 will decide to shut down or restart a system component that has the lowest impact on overall system performance. Typically, the system component that has the lowest impact on overall system performance is a component at the end of a chain of system components. This embodiment may be illustrated by an enterprise storage server system having multiple disks (i.e., hard disks) connected to multiple disk controllers, where each disk controller controls multiple disks. In addition, the controllers and disks may be contained within an enclosure. In this illustration, shutting down a disk only affects that one device, while shutting down a disk controller affects all the disks connected to the controller. Furthermore, resetting an enclosure will affect all the controllers and disks contained within. Thus, shutting down or resetting a single disk minimizes the impact on the storage server's overall performance.

FIG. 3 is a schematic block diagram illustrating another embodiment of an apparatus 300 for dynamically changing system recovery actions based on system load. The apparatus 300 includes another embodiment of the error recovery apparatus 104 with a monitoring module 202, an error detection module 204, a system workload analysis module 206, and a system recovery module 208, which are substantially similar to those described above in relation to apparatus 200 in FIG. 2. The apparatus 300 also includes a recovery impact analysis module 302, which is described below.

The recovery impact analysis module 302 determines, for each error recovery action of the set of error recovery actions selected by the system recovery module 208, an impact of the error recovery action on one or more performance characteristics of the computer system. A performance characteristic can be, but is not limited to, a workload characteristic. For example, a performance characteristic may be the number of data requests handled per second by a storage server system or the number of simultaneous users served a content delivery network server system. In one embodiment, the recovery impact analysis module 302 determines the impact of an error recovery action by calculating the minimum decrease in one or more performance characteristics that would be caused by initiating the error recovery action. For example, the recovery impact analysis module 302 can determine the impact of shutting down or restarting a disk controller on the data IO rate of a storage server system by calculating the ratio between the data IO rate of the disk controller to be shut down or rebooted and the data IO rate of the overall storage server system.

The system recovery module 208 also initiates an error recovery action from the set of error recovery actions in response to the recovery impact analysis module 302 determining the impact of each error recovery action from the set of error recovery actions on one or more performance characteristics of the computer system. In one embodiment, the system recovery module 208 initiates the error recovery action that has the lowest impact on one or more performance characteristics of the computer system. For example, if a set of error recovery actions for an error in a server storage system includes deferring error recovery and resetting a disk controller, the system recovery module 208 will choose to defer error recovery because this action has the lowest impact on the performance of the system. As another example, if the set of error recovery actions for an error in a content delivery network server includes collecting a dozen system parameters relating to the error or just logging five related parameters, the system recovery module 208 will elect to log only the five related parameters because of its lower impact on the performance of the system. In another example, if the set of error recovery actions for an error in a storage server system includes resetting a single disk and resetting a disk controller, the system recovery module 208 will reset the single disk because its impact on the performance of the system is minimal compared to resetting a disk controller.

Figure 4:
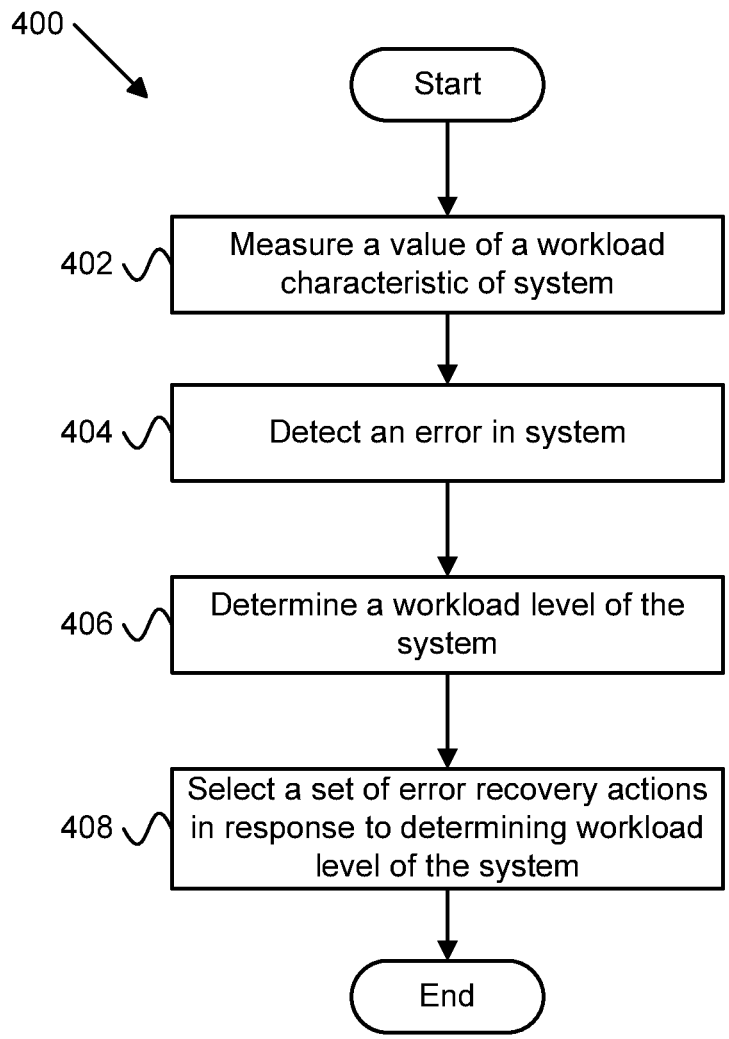
FIG. 4 is a schematic flow chart diagram illustrating one embodiment of a an method for dynamically changing system recovery actions based on system load.

FIG. 4 is a schematic block diagram illustrating one embodiment of a method 400 for dynamically changing system recovery actions based on system load. The method 400 begins and measures 402 a value of a workload characteristic of a computer system. The method 400 detects 404 an error in the computer system. The method 400 determines 406 a workload level of the computer system. The method 400 selects 408 a set of error recovery options in response to determining the workload level of the computer system and the method 400 ends.

Figure 5:
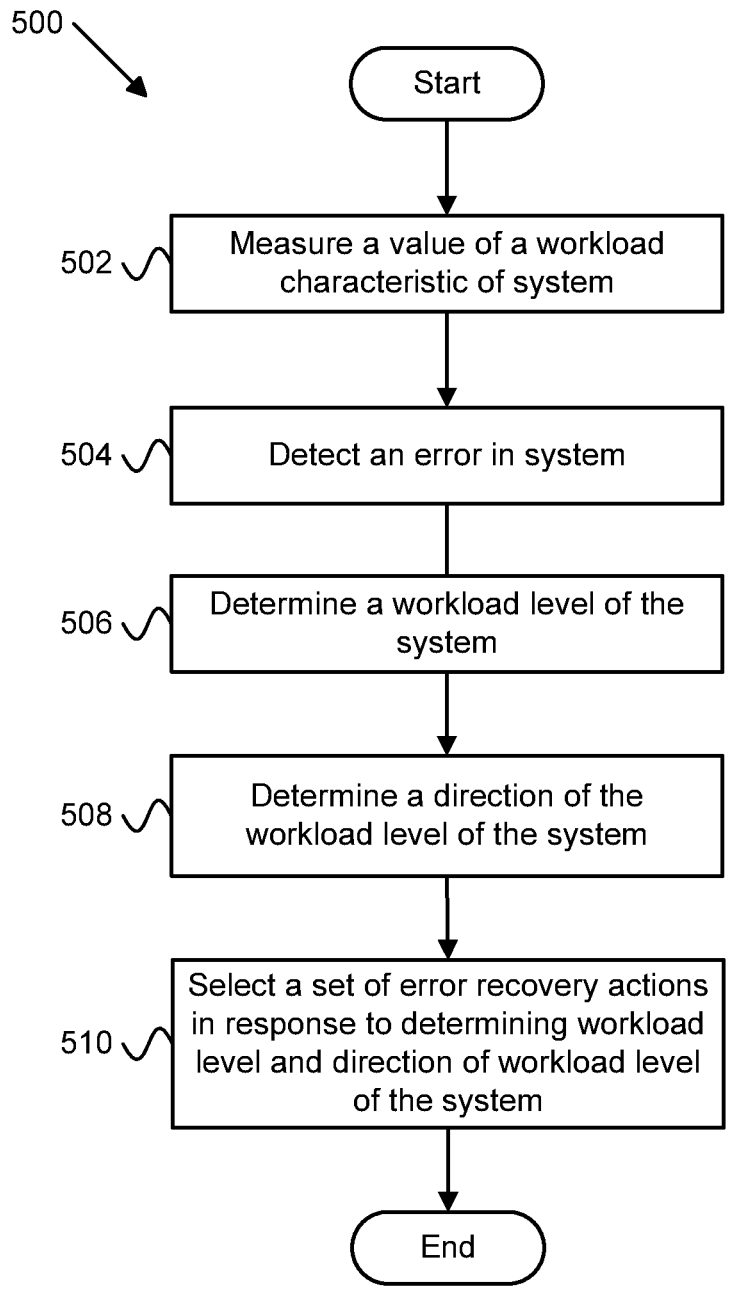
FIG. 5 is a schematic flow chart diagram illustrating another embodiment of a method for dynamically changing system recovery actions based on system load.

FIG. 5 is a schematic flow chart diagram illustrating another embodiment of a method 500 for dynamically changing system recovery actions based on system load. The method 500 begins and measures 502 a value of a workload characteristic of a computer system. The method 500 detects 504 an error in the computer system. The method 500 determines 506 a workload level of the computer system. The method 500 determines 508 a direction of the workload level of the system. In one embodiment, the method determines 508 the direction of the workload level of the system by determining the rate of change of the workload level of the system. The method 500 selects 510 a set of error recovery options in response to determining the workload level of the computer system and the direction of the workload level of the system and the method 500 ends.

Figure 6:
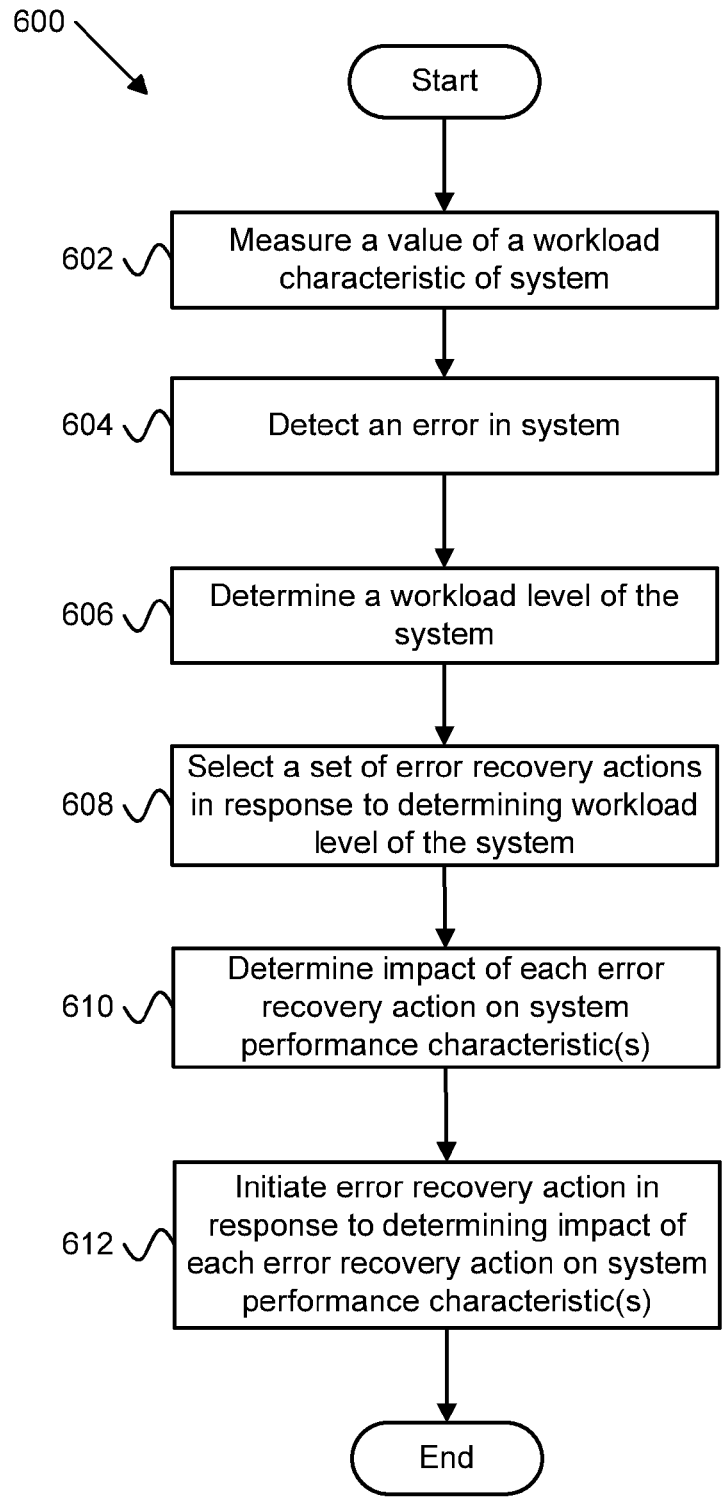
FIG. 6 is a schematic flow chart diagram illustrating yet another embodiment of a method for dynamically changing system recovery actions based on system load.

FIG. 6 is a schematic flow chart diagram illustrating yet another embodiment of a method 600 for dynamically changing system recovery actions based on system load. The method 600 begins and measures 602 a value of a workload characteristic of a computer system. The method 600 detects 604 an error in the computer system. The method 600 determines 606 a workload level of the computer system. The method 600 selects 608 a set of error recovery options in response to determining the workload level of the computer system. The method 600 determines 610, for each error recovery action in the set of error recovery actions, an impact of the error recovery action on one or more performance characteristics of the computer system. The method 600 initiates 612 an error recovery action in response to determining the impact of each error recovery action on the one or more performance characteristics of the computer system and the method 600 ends. In one embodiment, the method 600 initiates the error recovery action that has the lowest impact on the one or more performance characteristics of the computer system.

Figure 7:
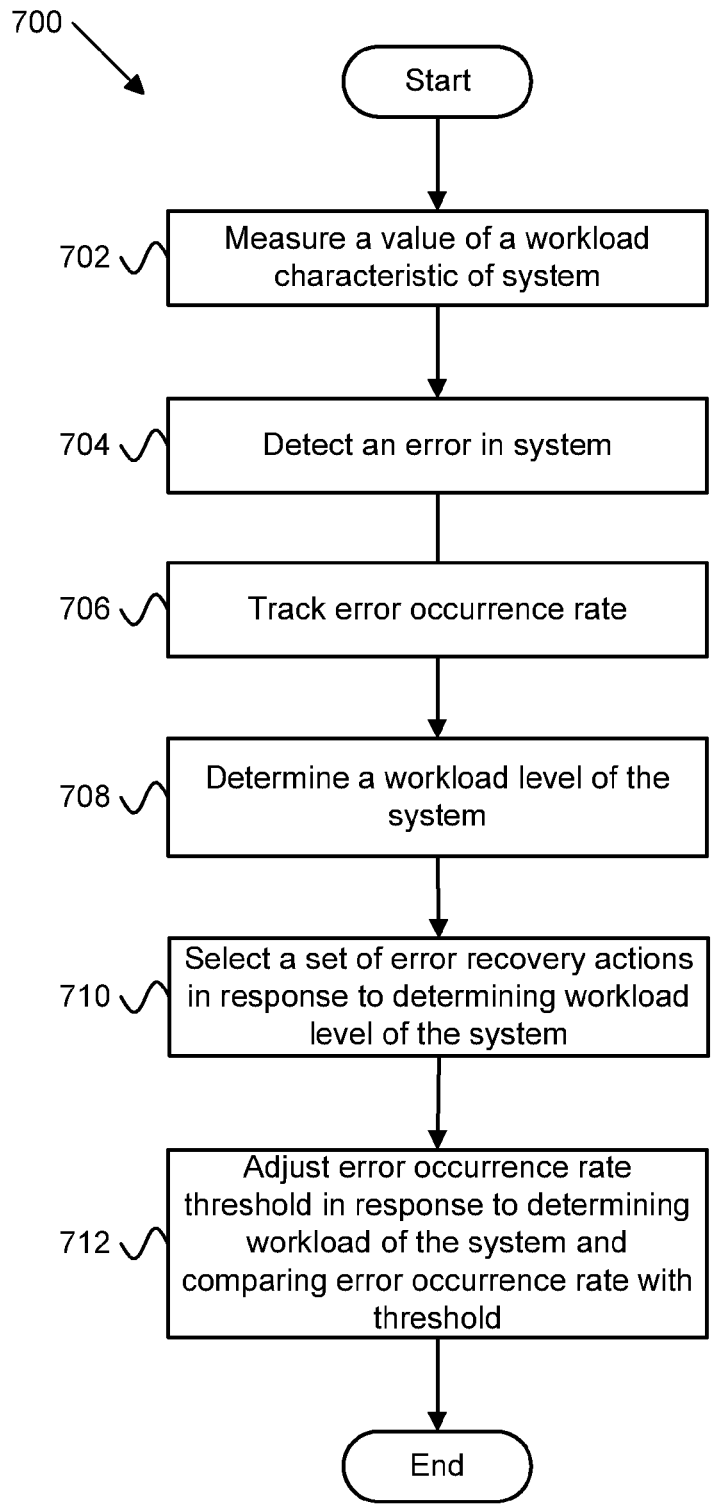
FIG. 7 is a schematic flow chart diagram illustrating still another embodiment of a method for dynamically changing system recovery actions based on system load.

FIG. 7 is a schematic flow chart diagram illustrating still another embodiment of a method 700 for dynamically changing system recovery actions based on system load. The method 700 begins and measures 702 a value of a workload characteristic of a computer system. The method 700 detects 704 an error in the computer system. The method 700 tracks 706 an error occurrence rate of the computer system. The method 700 determines 708 a workload level of the computer system. The method 700 selects 710 a set of error recovery options in response to determining the workload level of the computer system. The method 700 adjusts 712 an error occurrence rate threshold in response to determining the workload level of the computer system and comparing the error occurrence rate and the error occurrence rate threshold and the method 400 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a monitoring module that measures a value of a workload characteristic of a computer system over a period of time;
    an error detection module that detects an error in the computer system;
    a system workload analysis module that determines a workload level of the computer system by comparing:
        the measured value of the workload characteristic of the computer system when the error detection module detected the error to a highest measured value of the workload characteristic of the computer system during an earlier period of time prior to the error detection module detecting the error; and
    a system recovery module that selects a set of error recovery actions in response to the system workload analysis module determining the workload level of the computer system,
    wherein at least a portion of the monitoring module, the error detection module, the system workload analysis module, and the system recovery module comprise one or more of hardware and executable code, the executable code stored on one or more computer readable storage media.

2. The apparatus of claim 1, further comprising a recovery impact analysis module that determines, for each error recovery action of the set of error recovery actions, an impact of the error recovery action on one or more performance characteristics of the computer system.

3. The apparatus of claim 2, wherein the system recovery module further initiates an error recovery action from the set of error recovery actions in response to the recovery impact analysis module determining the impact of each error recovery action on the one or more performance characteristics of the computer system.

4. The apparatus of claim 3, wherein the system recovery module further initiates an error recovery action from the set of error recovery actions in response to the recovery impact analysis module determining the impact of each error recovery action on the one or more performance characteristics of the computer system comprises initiating the error recovery action having the lowest impact on the one or more performance characteristics of the computer system.

5. The apparatus of claim 1, wherein the system workload analysis module further determines a direction of the workload level of the computer system.

6. The apparatus of claim 1, wherein
the error detection module further tracks an error occurrence rate; and
the system recovery module further adjusts an error occurrence rate threshold in response to
the system workload analysis module determining the workload level of the computer system; and
comparing the error occurrence rate to the error occurrence rate threshold.

7. A method comprising:
measuring a value of a workload characteristic of a computer system over a period of time;
detecting an error in the computer system;
determining a workload level of the computer system by comparing:
the measured value of the workload characteristic of the computer system when the error detection module detected the error to a highest measured value of the workload characteristic of the computer system during an earlier period of time prior to the error detection module detecting the error; and
selecting a set of error recovery actions in response to determining the workload level of the computer system.

8. The method of claim 7, further comprising determining, for each error recovery action of the set of error recovery actions, an impact of the error recovery action on one or more performance characteristics of the computer system.

9. The method of claim 8, further comprising initiating an error recovery action from the set of error recovery actions in response to determining the impact of each error recovery action on the one or more performance characteristics of the computer system.

10. The method of claim 9, wherein initiating an error recovery action from the set of error recovery actions in response to determining the impact of each error recovery action on the one or more performance characteristics of the computer system comprises initiating the error recovery action having the lowest impact on the one or more performance characteristics of the computer system.

11. The method of claim 7, further comprising determining a direction of the workload level of the computer system.

12. The method of claim 7, further comprising
tracking an error occurrence rate; and
adjusting an error occurrence rate threshold in response to
determining the workload level of the computer system; and
comparing the error occurrence rate and the error occurrence rate threshold.

13. A computer program product comprising a computer readable storage medium having program instructions embodied therewith, the program instructions readable/executable by a processor to cause the processor to:
measure a value of a workload characteristic of a computer system over a period of time;
detect an error in the computer system;
determine a workload level of the computer system by comparing:
the measured value of the workload characteristic of the computer system when the error detection module detected the error to a highest measured value of the workload characteristic of the computer system during an earlier period of time prior to the error detection module detecting the error; and
select a set of error recovery actions in response to determining the workload level of the computer system.

14. The computer program product of claim 13, the program instructions further causing the processor to determine, for each error recovery action of the set of error recovery actions, an impact of the error recovery action on one or more performance characteristics of the computer system.

15. The computer program product of claim 14, the program instructions further causing the processor to initiate an error recovery action from the set of error recovery actions in response to determining the impact of each error recovery action on the one or more performance characteristics of the computer system.

16. The computer program product of claim 15, wherein the processor initiating an error recovery action from the set of error recovery actions in response to determining the impact of each error recovery action on the one or more performance characteristics of the computer system comprises initiating the error recovery action having the lowest impact on the one or more performance characteristics of the computer system.

17. The computer program product of claim 13, the program instructions further causing the processor to determine a direction of the workload level of the computer system.

* * * * *